US010922389B2

(12) United States Patent
Li

(10) Patent No.: US 10,922,389 B2
(45) Date of Patent: *Feb. 16, 2021

(54) IDENTIFYING COPYRIGHTED MATERIAL USING COPYRIGHT INFORMATION EMBEDDED IN ELECTRONIC FILES

(71) Applicant: Advanced New Technologies Co., Ltd., Grand Cayman (KY)

(72) Inventor: Zhiguo Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,920

(22) Filed: Dec. 13, 2019

(65) Prior Publication Data

US 2020/0372134 A1  Nov. 26, 2020

Related U.S. Application Data

(63) Continuation of application No. PCT/CN2019/087639, filed on May 20, 2019.

(51) Int. Cl.
*H04L 29/06* (2006.01)
*G06F 21/00* (2013.01)
(Continued)

(52) U.S. Cl.
CPC ............ *G06F 21/16* (2013.01); *H04L 9/3239* (2013.01); *H04L 9/3297* (2013.01);
(Continued)

(58) Field of Classification Search
CPC ..... G06F 21/16; G06F 21/105; H04L 9/3239; H04L 9/3297; H04L 9/006; H04L 9/0637; H04L 9/0643

See application file for complete search history.

(56) References Cited

U.S. PATENT DOCUMENTS

| 5,822,436 A | 10/1998 | Rhoads |
| 6,769,061 B1 | 7/2004 | Ahern |

(Continued)

FOREIGN PATENT DOCUMENTS

| CN | 102393892 | 3/2012 |
| CN | 102479297 | 5/2012 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mohammad A Siddiqi
(74) *Attorney, Agent, or Firm* — Fish & Richardson P.C.

(57) ABSTRACT

Disclosed herein are methods, systems, and apparatus, including computer programs encoded on computer storage media, for embedding copyright information in one or more pages for presenting digital content. One of the methods includes generating, by a computing device, a unique identifier (ID) based on copyright information associated with the digital content; identifying one or more attributes associated with a page design of one or more blank pages of an electronic file; embedding the unique ID in the one or more blank pages by changing the one or more attributes to be representative of the unique ID; allocating the digital content to at least one of the one or more information-embedded pages; and distributing, by the computing device, the one or more information-embedded pages allocated with the digital content to the blockchain network.

25 Claims, 8 Drawing Sheets

(51) Int. Cl.
*G06F 21/16* (2013.01)
*H04L 9/32* (2006.01)

(52) U.S. Cl.
CPC .... *G06F 2221/0737* (2013.01); *H04L 9/3247* (2013.01); *H04L 2209/38* (2013.01)

(56) References Cited

U.S. PATENT DOCUMENTS

| | | | |
|---|---|---|---|
| 7,068,787 | B1 | 6/2006 | Ta et al. |
| 8,311,265 | B2 | 11/2012 | Wang et al. |
| 8,570,586 | B2 | 10/2013 | Calhoon et al. |
| 9,259,955 | B1* | 2/2016 | Ragner ............... G09B 29/04 |
| 9,420,143 | B2 | 8/2016 | Clisson |
| 10,140,392 | B1 | 11/2018 | Bowen |
| 10,291,627 | B2* | 5/2019 | Gleichauf ............ H04W 8/24 |
| 10,404,467 | B1* | 9/2019 | Winarski ............. H04L 9/3239 |
| 10,417,667 | B1* | 9/2019 | Agostino ........... G06Q 30/0269 |
| 10,543,711 | B2 | 1/2020 | Rodriguez et al. |
| 2002/0164053 | A1 | 11/2002 | Seder et al. |
| 2003/0023640 | A1 | 1/2003 | Challenger et al. |
| 2003/0149936 | A1 | 8/2003 | Tamaru |
| 2004/0001606 | A1 | 1/2004 | Levy |
| 2004/0114190 | A1 | 6/2004 | Man |
| 2004/0135906 | A1 | 7/2004 | Okada |
| 2005/0053258 | A1 | 3/2005 | Pasqua |
| 2005/0172130 | A1 | 8/2005 | Roberts |
| 2006/0072778 | A1 | 4/2006 | Harrington |
| 2008/0071929 | A1* | 3/2008 | Motte ................. H04L 67/20 709/246 |
| 2009/0228592 | A1* | 9/2009 | Snyder .................. G06F 21/16 709/226 |
| 2010/0309505 | A1 | 12/2010 | Partridge et al. |
| 2011/0119293 | A1 | 5/2011 | Taylor et al. |
| 2012/0054595 | A1 | 3/2012 | Mylroie et al. |
| 2013/0028466 | A1 | 1/2013 | Wang et al. |
| 2013/0208941 | A1 | 8/2013 | Liu |
| 2016/0070889 | A1 | 3/2016 | Hendricks et al. |
| 2016/0253622 | A1 | 9/2016 | Sriram et al. |
| 2016/0283920 | A1 | 9/2016 | Fishet et al. |
| 2016/0300234 | A1* | 10/2016 | Moss-Pultz ............ G06F 21/10 |
| 2016/0358187 | A1 | 12/2016 | Radocchia et al. |
| 2017/0116693 | A1 | 4/2017 | Rae et al. |
| 2017/0169737 | A1 | 6/2017 | Probert |
| 2017/0220815 | A1 | 8/2017 | Ansari et al. |
| 2017/0301033 | A1 | 10/2017 | Brown et al. |
| 2017/0331980 | A1 | 11/2017 | Tokuchi |
| 2018/0068091 | A1* | 3/2018 | Gaidar ................. G06F 21/16 |
| 2018/0205546 | A1 | 7/2018 | Haque et al. |
| 2018/0247386 | A1 | 8/2018 | Zheng et al. |
| 2018/0268116 | A1 | 9/2018 | Deaver |
| 2018/0293670 | A1 | 10/2018 | Yin |
| 2018/0294957 | A1 | 10/2018 | O'Brien et al. |
| 2018/0336286 | A1 | 11/2018 | Shah |
| 2018/0343128 | A1 | 11/2018 | Uhr et al. |
| 2018/0349572 | A1 | 12/2018 | Chen et al. |
| 2018/0374173 | A1* | 12/2018 | Chen ................... H04L 9/3236 |
| 2019/0080392 | A1* | 3/2019 | Youb .................. H04L 9/0643 |
| 2019/0102782 | A1 | 4/2019 | Diehl |
| 2019/0155997 | A1 | 5/2019 | Vos et al. |
| 2019/0236285 | A1 | 8/2019 | Cantrell et al. |
| 2019/0251648 | A1 | 8/2019 | Liu et al. |
| 2019/0294761 | A1 | 9/2019 | Kim et al. |
| 2019/0325115 | A1 | 10/2019 | Wilkinson et al. |
| 2019/0370440 | A1 | 12/2019 | Gu et al. |
| 2019/0386814 | A1 | 12/2019 | Ahmed |
| 2020/0012765 | A1 | 1/2020 | Smaiely et al. |
| 2020/0175590 | A1* | 6/2020 | Huo .................... H04L 9/0816 |

FOREIGN PATENT DOCUMENTS

| | | |
|---|---|---|
| CN | 102495833 | 6/2012 |
| CN | 103500296 | 1/2014 |
| CN | 105184345 | 12/2015 |
| CN | 107659610 | 2/2018 |
| CN | 108053359 | 5/2018 |
| CN | 108090329 | 5/2018 |
| CN | 108182349 | 6/2018 |
| CN | 108776941 | 11/2018 |
| CN | 109102305 | 12/2018 |
| CN | 109344568 | 2/2019 |
| CN | 109409030 | 3/2019 |
| CN | 109614775 | 4/2019 |
| CN | 109635521 | 4/2019 |
| CN | 109657426 | 4/2019 |
| CN | 109711120 | 5/2019 |
| CN | 109727134 | 5/2019 |
| CN | 109766673 | 5/2019 |
| CN | 109767375 | 5/2019 |
| KR | 20160077747 | 7/2016 |
| KR | 101897032 | 9/2018 |

OTHER PUBLICATIONS

Nakamoto, "Bitcoin: A Peer-to-Peer Electronic Cash System," www.bitcoin.org, 2005, 9 pages.
Agarwal, "Text Steganographic Approaches: A Comparison," International Journal of Network Security and Its Applications (IJNSA), Jan. 2013, 5(1):91-106.
English translation of written description of CN102495833, WIPO Patentscope, Jun. 2013, 4 pages.
English translation of written description of CN108182349, WIPO Patenscope, Jun. 2018, 5 pages.
English translation of written description of CN109711120, WIPO Patentscope, May 2019, 5 pages.
Extended European Search Report in European Application No. 19741571.4, dated May 20, 2020, 11 pages.
PCT International Search Report and Written Opinion in International Application No. PCT/CN2019/087639, dated Feb. 28, 2020, 7 pages.
Extended European Search Report in European Application No. 19741693.6, dated Apr. 8, 2020, 8 pages.
Meng et al., "Design scheme of copyright management system based on digital watermarking and blockchain," 42nd IEEE Internaitonal Conference on Computer Software and Applications, Jul. 2018, pp. 359-364.
PCT International Search Report and Written Opinion in International Application No. PCT/CN2019/087617, dated Feb. 26, 2020, 8 pages.
PCT International Search Report and Written Opinion in International Application No. PCT/CN2019/087624, dated Feb. 20, 2020, 8 pages.
PCT International Search Report and Written Opinion in International Application No. PCT/CN2019/087629, dated Feb. 6, 2020, 7 pages.
PCT International Search Report and Written Opinion in International Application No. PCT/CN2019/087635, dated Feb. 27, 2020, 6 pages.
PCT International Search Report and Written Opinion in International Application No. PCT/CN2019/087646, dated Feb. 26, 2020, 6 pages.
PCT International Search Report and Written Opinon in International Application No. PCT/CN2019/087609, dated Feb. 24, 2020, 6 pages.
Rosenblatt, Digimarc.com [online], "Watermarking Technology and Blockchains in the Music Industry," retrieved on Apr. 9, 2020, retrieved from URL<https://www.digimarc.com/docs/default-source/digimarc-resources/whitepaper-blockchain-in-music-industry.pdf?sfvrsn=2, 25 pages.
Usha et al., "Design Scheme for Copyright Management System Based on Digital Watermarking and Blockchain," Journal of Emerging Technologies and Innovative Research, Apr. 2019, 6(4):188-191.
U.S. Appl. No. 16/713,693, filed Dec. 13, 2019, Li.
U.S. Appl. No. 16/713,819, filed Dec. 13, 2019, Li.
U.S. Appl. No. 16/713,829, filed Dec. 13, 2019, Li.
U.S. Appl. No. 16/713,855, filed Dec. 13, 2019, Li.
U.S. Appl. No. 16/713,859, filed Dec. 13, 2019, Li.

(56) References Cited

OTHER PUBLICATIONS

U.S. Appl. No. 16/713,904, filed Dec. 13, 2019, Li.
Extended European Search Report in European Application No. 19740866.9, dated Jun. 22, 2020, 10 pages.
Extended European Search Report in European Application No. 19741345.3, dated Sep. 4, 2020, 11 pages.
Extended European Search Report in European Application No. 19743776.7, dated Sep. 2, 2020, 8 pages.
Extended European Search Report in European Application No. 19741694.4, dated Oct. 12, 2020, 11 pages.
Mir "Copyright for web content using invisible text watermarking," Computers in Human Behavior, Jan. 2014, 30 (1):648-652.

* cited by examiner

TRANSACTION

500

502 → c2a416c8c2f2c8d9cb46b76fd13c7243c763bb6debd728f8ea854e8258ffcb12

504 → MONDAY, MARCH 11, 2019 1:30 AM
(THREE WEEKS AGO, 86 CONFIRMATIONS)

| | | | |
|---|---|---|---|
| ORIGIN | | 11fFF9f647B1a64660074495fd76D7fd6b150CdC | 506 |
| FROM | | c6363275Bca07Ee0fa000ccC15b57e58C954d843 | 508 |
| TO | | 62A758283Fcf8f5F286e2512CB7AEbf18859daB | 510 |
| FEE PAID | 0.00026 ETHER | | 512 |
| GAS USED | 13,000 | | |
| GAS PRICE | 0.02 ETHER PER MILLION GAS | | |
| BLOCK | 124<br>f63251d312521c490284f01f8307a3d1c607bdc4bc... | | 514 |

FIG. 5

IDENTIFYING COPYRIGHTED MATERIAL USING COPYRIGHT INFORMATION EMBEDDED IN ELECTRONIC FILES

CROSS-REFERENCE TO RELATED APPLICATIONS

This application is a continuation of PCT Application No. PCT/CN2019/087639, filed on May 20, 2019, which is hereby incorporated by reference in its entirety.

TECHNICAL FIELD

This specification generally relates to copyright protection based on blockchain technology.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. DLS technology creates a transparent chain-of-records by allowing all parties to a transaction to verify what will be entered onto a ledger, and prevent any party from changing the ledger after the transaction is entered. Each transaction or block of transactions is transmitted to all the participants in the blockchain network and is verified by each participant node before adding to the blockchain.

With the advancement of digital technologies, online digital content can often be reproduced, edited, recorded, and distributed by Internet users. In some cases, such uses can violate copyright of the creator or owner of the content. New technologies can also make management and protection of copyrighted content difficult. For example, such technologies can enable copies of copyrighted content to be rapidly produced and spread to large numbers of users, which can significantly affect the economic interests of the copyright holder.

DLS technology creates a secure, time-stamped, and immutable chain-of-records, making it well-suited to protect against copyright infringement. For example, a distributed ledger containing the copyright holder's information and update history relating to the copyrighted content can be used to determine ownership or infringement of the content.

However, when only a portion of copyrighted content is used by unauthorized users, it can be difficult to identify that the used portion is part of a copyrighted work. Therefore, it would be desirable to embed copyright information in the background, foreground, or the content itself, such that copyrighted material can be more easily identified.

SUMMARY

This specification describes technologies for embedding copyright information in electronic files. These technologies generally involve generating a unique identifier (ID) based on copyright information associated with the digital content; identifying one or more attributes associated with a page design of one or more blank pages of an electronic file; embedding the unique ID in the one or more blank pages by changing the one or more attributes to be representative of the unique ID; allocating the digital content to at least one of the one or more information-embedded pages; and distributing the one or more information-embedded pages allocated with the digital content to the blockchain network.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIG. 5 depicts an example of a blockchain transaction record in accordance with embodiments of this specification.

Like reference numbers and designations in the various drawings indicate like elements.

DETAILED DESCRIPTION

Figure 1:
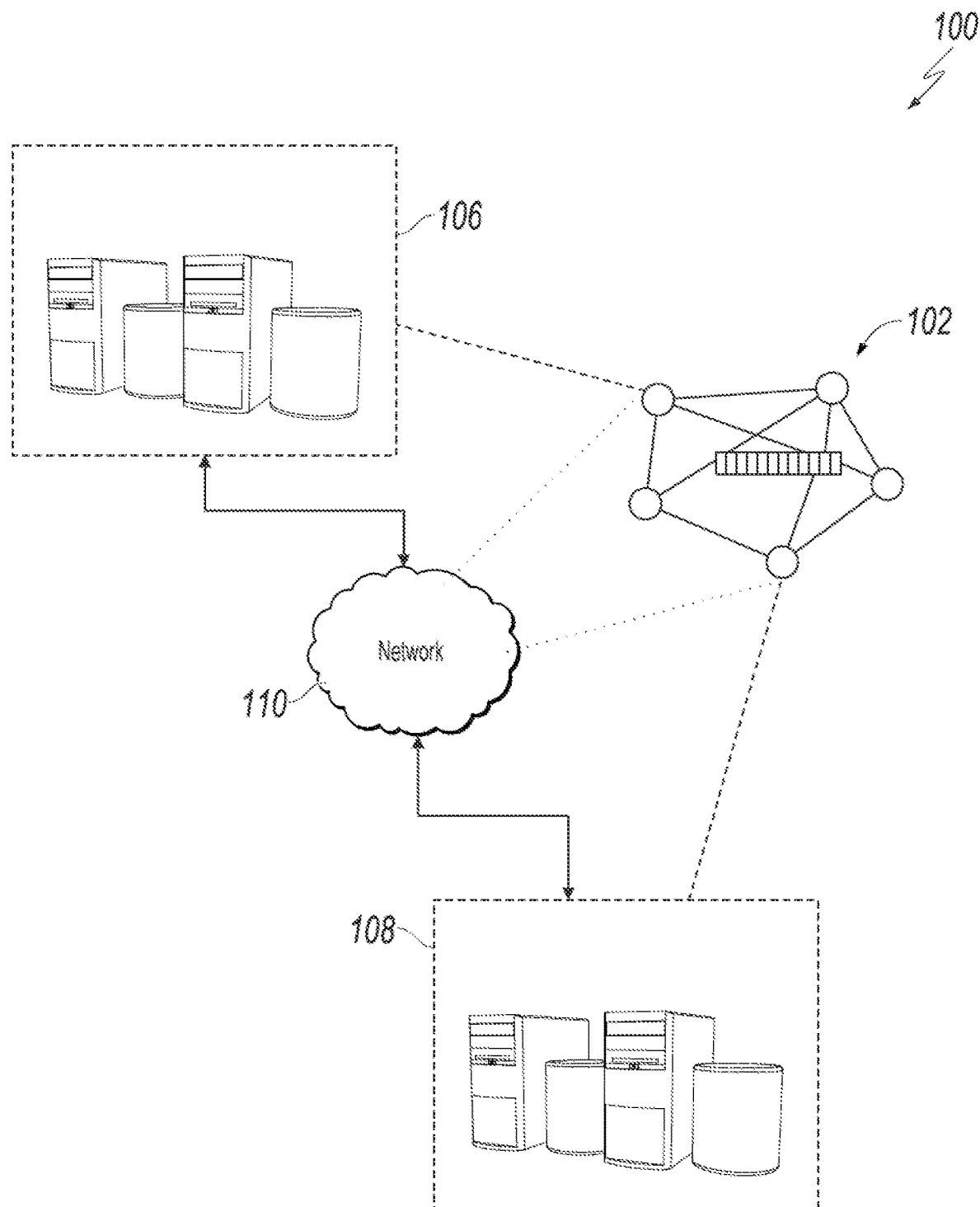
FIG. 1 is a diagram illustrating an example of an environment that can be used to execute embodiments of this specification.

This specification describes technologies for embedding copyright information in electronic files. These technologies generally involve generating a unique identifier (ID) based on copyright information associated with the digital content; identifying one or more attributes associated with a page design of one or more blank pages of an electronic file; embedding the unique ID in the one or more blank pages by changing the one or more attributes to be representative of the unique ID; allocating the digital content to at least one of the one or more information-embedded pages; and distributing the one or more information-embedded pages allocated with the digital content to the blockchain network.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
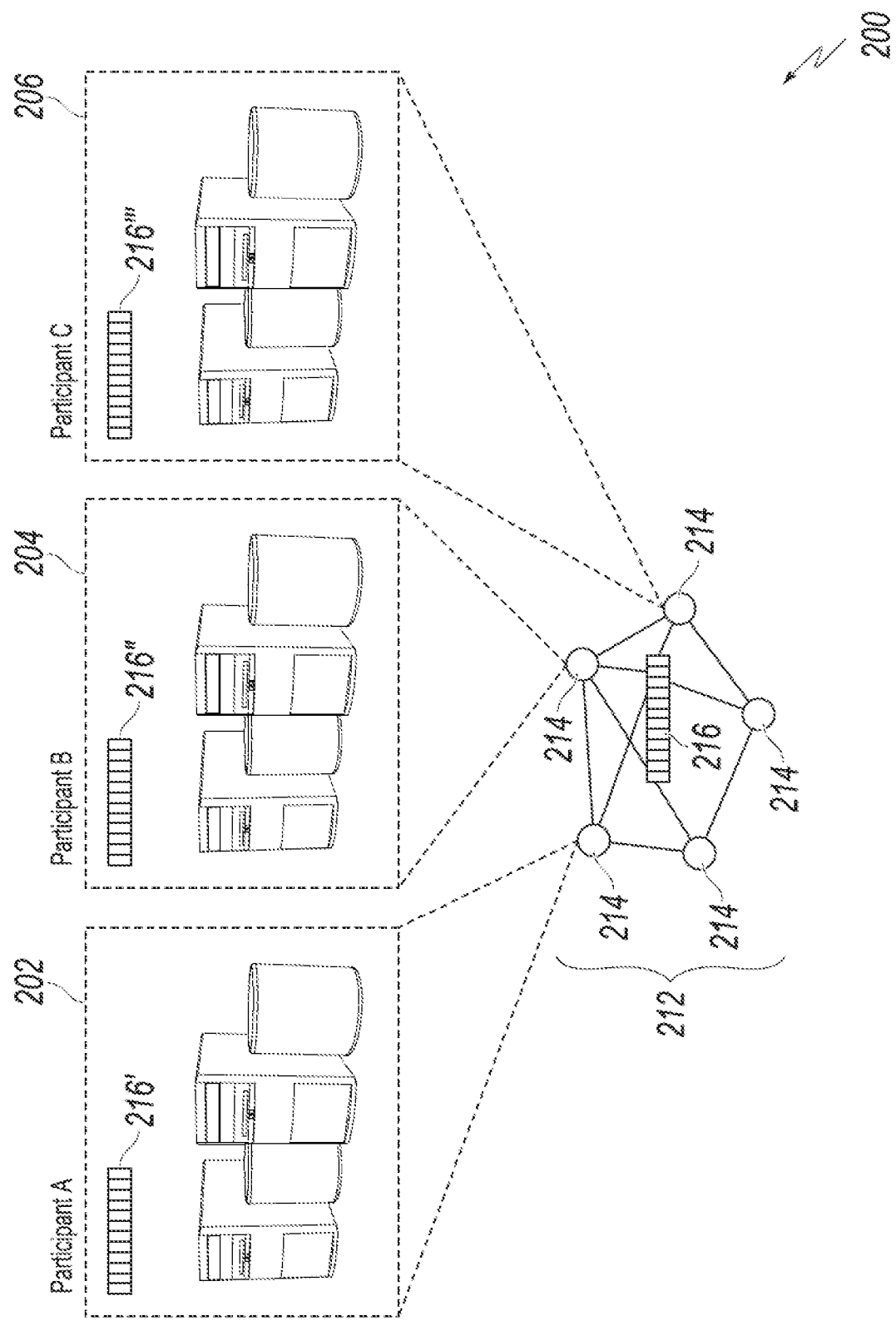
FIG. 2 is a diagram illustrating an example of an architecture in accordance with embodiments of this specification.

FIG. 2 depicts an example of an architecture 200 in accordance with embodiments of this specification. The architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses key pairs that each include a private key and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

As described above, blockchain can be used to generate an immutable and transparent chain-of-record that can assist in identification and authentication of creators or right holders of original copyrighted works. For example, a transaction related to copyrighted content (e.g., a content update or newly entered identity information associated with creator of the content) recorded on the blockchain can be encoded as a unique ID. The unique ID can be invisibly embedded in background pages of electronic files (e.g., MICROSOFT WORD documents) without affecting their visual presentation, and is undiscernible or not readily apparent to an inspecting user. In some embodiments, the unique ID can also be invisibly embedded to the copyrighted content. The copyrighted content can then be presented on the background pages that are embedded with the unique ID.

To determine the copyright holder and identify potential copyright infringement, the embedded unique ID can be extracted from the tables or forms to decode the transaction. The transaction can then be used to retrieve a chain-of-record associated with the copyrighted content. In some embodiments, the chain-of-record can be used to identify a copyright holder, and seek permission from the copyright holder to copy, modify, distribute, or publicly display copyrighted works. In some embodiments, the chain-of-record can also be used to resolve copyright dispute or determine whether the copyrighted content has been tampered with.

Figure 3:
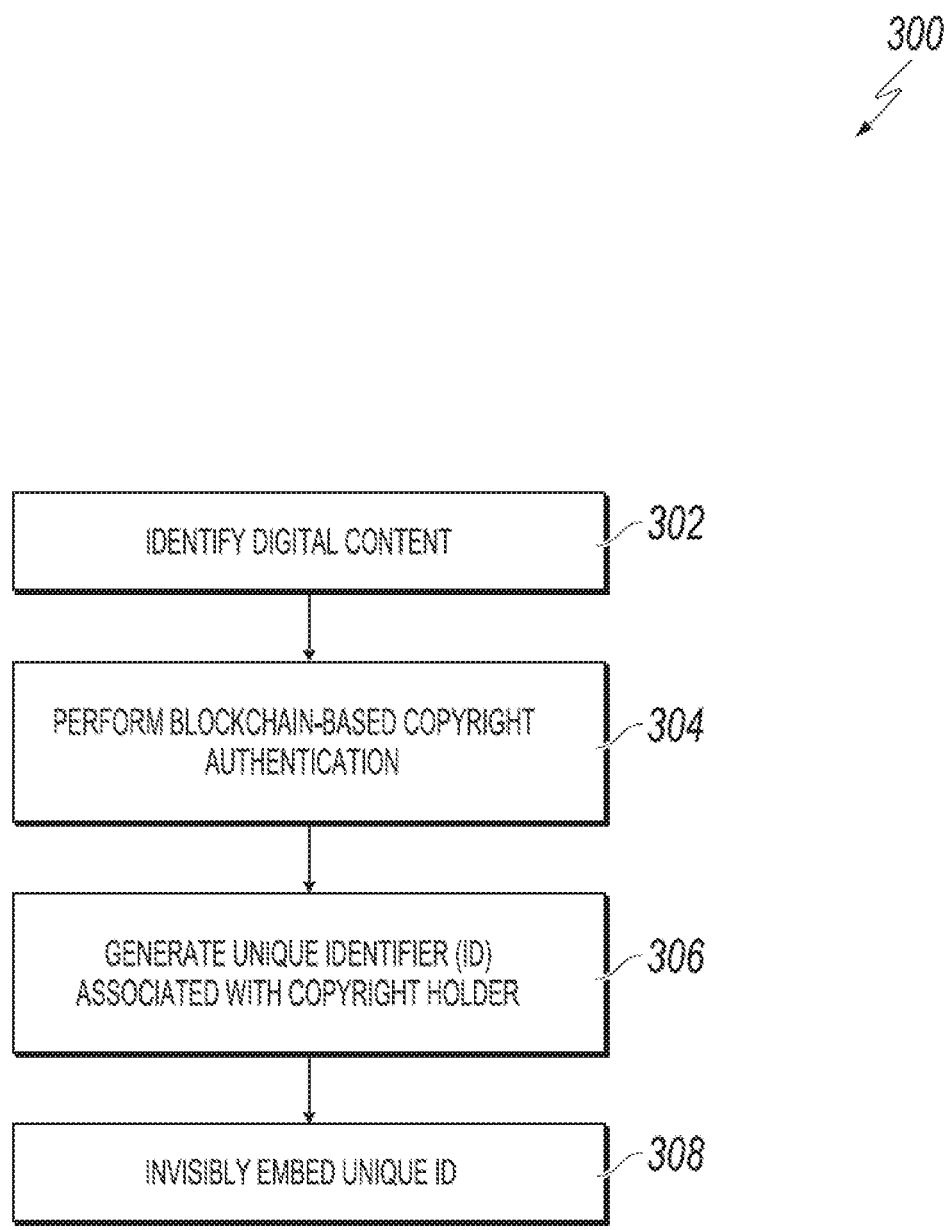
FIG. 3 is a flowchart illustrating an example of a process that can be executed in accordance with embodiments of this specification.

FIG. 3 is a flowchart illustrating an example of a process 300 that can be executed in accordance with embodiments of this specification. The process 300 can be performed by one or more blockchain nodes or a computing device communicably coupled to the one or more blockchain nodes. For clarity of presentation, the description that follows generally describes process 300 in the context of the other figures in this description. However, it will be understood that process 300 can be performed, for example, by any system, environment, software, and hardware, or a combination of systems, environments, software, and hardware, as appropriate. In some embodiments, various steps of process 300 can be run in parallel, in combination, in loops, or in any order.

At 302, a digital content is identified. The digital content can be content of a copyrighted work (i.e., copyrighted digital content, or simply, copyrighted content) associated with a copyright holder. Copyrighted works can be any original or creative works, such as literary works, motion pictures, choreography, musical compositions, sound recordings, paintings, drawings, sculptures, photographs, computer software, radio and television broadcasts, or industrial designs. Copyrighted content can exist in the form of digital data, which can be digitally transmitted, streamed, contained in computer files, or stored as a transaction record in a blockchain.

At 304, blockchain-based copyright authentication is performed. In some embodiments, copyright authentication can include authenticating a right holder of copyrighted content. As discussed earlier, blockchain provides an immutable chain-of-record of transactions related to the copyrighted content. For example, transactions related to the copyrighted content can include the original digital content, timestamps or locations of content creation and distributions, content update or modification history, creatorship, ownership, licensing information, or other information. After a transaction is approved, a corresponding blockchain transaction ID can be recorded to the corresponding block and distributed to the distributed ledger of the blockchain network. In some embodiments, the transactions can also be embedded with smart contract information associated with an Ethereum blockchain.

The right holder of copyrighted content can be authenticated based on traversing transaction records of the copyrighted content on the blockchain. For example, a blockchain transaction ID associated with a record of the copyrighted content on the blockchain can be determined. A chain-of-record associated with the blockchain transaction ID can then be traversed until a record on ownership or creatorship associated with the copyrighted content is identified. The identified owner or creator of the content recorded on the blockchain can be determined as the authentic right holder. In some embodiments, the ownership or creatorship information may not be recorded on the blockchain. In such cases, the right holder may be authenticated if other information (e.g., detailed update and modification history) can be provided to match records on the blockchain.

At 306, a unique ID associated with the copyright holder can be generated. The unique ID can be used to uniquely identify the copyright holder. In some embodiments, the unique ID can be a public key certificate issued by a certificate authority (CA). For example, the CA can be one or more trusted entities of a consortium blockchain. The certificate can include the copyrighted content, information about the identity of the copyrighted holder, and the digital signature of the CA. In some embodiments, the unique ID can include the copyright holder's identity information digitally signed by its private key. The copyright holder can then be identified by decrypting the digital signature with the public key corresponding to the copyright holder and verified by comparing the decrypted information to the copyright holder's information in the blockchain.

The copyright holder can be an individual or a business entity. Example identity information of individual copyright holder can include one or more of the right holder's residence ID, passport number, driver's license number, phone number, or name. Example identity information of business copyright holder can include one or more of business registration number, tax ID, registered name, phone number, address, or trademark.

In some embodiments, the unique ID can be generated based on transactions associated with the copyrighted content recorded on the blockchain. As discussed earlier, those transactions can include the copyrighted content, timestamps or locations of content creation and distributions, content update or modification history, creatorship, ownership, licensing information, etc. The unique ID can be generated based on one or more transactions. In some cases, at least a portion of the copyrighted content can be used to generate the unique ID, such as by generating a hash value based on the portion of the content. In some examples, the portion of the copyrighted content preserves the originality of the copyrighted, and can be used to identify the copyrighted content it is extracted from. To identify the copyright holder, the portion of the copyrighted content can be used to identify a blockchain transaction ID corresponding to the recordation of the copyrighted content on the blockchain. The blockchain transaction ID can then be used to retrieve an entire chain-of-record associated with the copyrighted content to identify the copyright holder. In some embodiments, the unique ID can also be generated based on the one or more transactions and one or more of the corresponding timestamps and locations.

In some embodiments, the unique ID can be invisibly embedded in data carriers as a digital watermark, such that it can be extracted to obtain associated copyright information. In some embodiments, the unique ID can be encrypted or hashed to enhance the robustness and security of the digital watermark. For example, the encryption can be performed based on public key encryption using the copyright holder's public key. In some embodiments, the encryption can also be performed based on encryption schemes such as the Arnold scrambling encryption to adapt to the embedding technique used. By performing encryption, even if an attacker extracts the digital watermark, the associated identity information cannot be decrypted if the encryption scheme or encryption key is unknown to the attacker.

In some embodiments, timestamps and addresses associated with the transactions of the copyrighted content can be added to generate the unique ID. The addition of timestamp and address information can further ensure uniqueness of the ID. The timestamp and address information can also be used to identify and authenticate the right holder for copyright infringement detection and enforcement. In some embodiments, the unique ID can also be a digital signature generated based on the right holder's private key.

At 308, the unique ID is invisibly embedded. In some examples, the embedded unique ID can be considered invisible if its addition is not noticeable or visible to naked eyes. In other words, the unique ID can be considered invisible if the visual difference between the copyrighted contents before embedding the unique ID and after embedding the unique ID is not apparent to an unaided human eye. The unique ID can be embedded in copyrighted content, foreground of the copyrighted content, or background of the copyrighted content. The foreground of the copyrighted content can be a film or screen attached or integrated to a platform where the copyrighted content is displayed. The foreground of the copyrighted content can also be a layer including the unique ID that is configured not to be rendered by a viewing application. The background of the copyrighted content can be a physical object (e.g., paper) the copyrighted content is printed on, or a background of a visual representation of an electronic file containing the copyrighted content that is rendered on a display.

The invisible embedding of copyrighted content can be performed based on digital watermarking. Digital watermarking is a technique of using data carriers to embed copyright information. Data carriers can include text, images, physical or electronic media. The unique ID can be embedded in the data carriers as an invisible digital watermark. When a copyright dispute occurs, the unique ID can be extracted from the data carriers to verify the ownership of the copyright.

Digital watermarking techniques can include background brightness masking, illuminance masking, texture masking, spatial masking and frequency masking. Different techniques can be based on different digital watermarking algorithms. In some embodiments, digital watermark embedding can be based on human visual system (HVS) characteristics to achieve visual imperceptibility or invisibility. For example, the human eyes are more sensitive to the changes in the low intensity pixels than the higher intensity ones. In illuminance masking, pixels of digital copyrighted content can be scanned to identify those with high intensity levels. The high intensity pixels can be used to embed the digital watermark. Modifications made to the high intensity pixels can be difficult to perceive by human eyes, such that the digital watermark can be considered invisibly embedded. Using illuminance masking, the digital watermark can be embedded in the entire copyrighted content or a portion of the content. For example, if the copyrighted content is textual content, the digital watermark can be embedded in a letter, a word, a sentence, or all the way up to the entire textual content.

As another example, in texture masking, the more complex the texture is, the more difficult the human eyes can discern the change of the texture. Therefore, the digital watermark can be embedded to a portion of a copyrighted image or background of copyrighted content with more complex texture to be less perceptible by human eyes.

As yet another example, digital watermarking can be performed based on frequency masking by transforming the copyrighted content to frequency domain coefficients based on mathematical transformations such as discrete cosine transform (DCT), discrete wavelet transform (DWT), or Arnold transform. In frequency masking, intermediary or low frequency coefficients are normally modified according to the watermark information. Those frequency ranges are less impactful to the appearance of the original content. The digital watermark (i.e., the unique ID) can be in the form of a character string. The character string can be converted to a single binary string. Each bit can be embedded to adjust lower frequency coefficients depending on the transformation technique used. In frequency masking, the digital watermark can be dispersed to the whole copyrighted content, which can increase robustness and invisibility. Other example mathematical transformations for performing digital watermarking can include DWT and singular value decomposition (DWT-SVD), least significant bit (LSB), or highly undetectable steganography (HUGO).

In some embodiments, more than one digital watermarking technique can be used to embed multiple layers of digital watermarks to the data carrier. In such cases, an index of the layers of digital watermarking can also be generated and embedded in the data carrier. The index can be used to more easily extract digital watermarks from the data carriers when performing copyright authentication or infringement identification. In some embodiments, the unique ID can be randomized or mixed with a random signal before embedding to the data carrier.

In some examples, the copyrighted content can be textual content. The embedded unique ID can be considered invisible if it does not materially change the content. The content can be considered not materially changed if the embedded information does not alter the meaning of the text. For example, the original text is "he becomes a monster after seven years," and the information embedded text is "he has become a 'monster' after seven years." The information embedded in the added text is not considered as materially changed from the original text, since the meaning of the text stays the same. In this example, the unique ID can be embedded in the quotation marks, or the auxiliary word "has," according to the techniques described herein. In some embodiments, the unique ID can be embedded in spaces or function words such as articles, prepositions, conjunctions, and auxiliaries, which do not normally alter the material meaning of textual content.

In some embodiments, a plurality of unique IDs can be used to track the updates of the textual content. For example, one or more unique IDs can be generated based on identity information of the copyright holder and timestamps corresponding to one or more content updates recorded on the blockchain. When a content update is performed and recorded on the blockchain, a unique ID including the corresponding timestamp can be embedded in at least a portion of the updated content. To authenticate the right holder, the timestamps in the unique IDs extracted from the copyrighted content can form a timeline of creation and update history of the content. The timeline can be used as evidence of the content development process, and compared to the update history recorded on the blockchain to authenticate authorship of the textual content.

In some embodiments, the unique ID can be embedded in characteristics information of textual or image content. Example characteristics information can include color, brightness, and transparency of text or image. For example, text or image color can be encoded based on a red, green, and blue (RGB) color model. The unique ID can be embedded to slightly change the RGB value combination not noticeable by naked eyes. As another example, the unique ID can be embedded in YCbCr formatted text or image, where Y represents the luminance signal, Cb represents chrominance blue signal, and Cr represents chrominance red signal. The luminance signal is relatively insensitive to information embedding, which can be preferably used to invisibly embed the unique ID.

In some embodiments, the unique ID can be embedded in punctuations of textual content. For example, in the text "after seven years, he becomes a 'monster'," the unique ID can be embedded in the encoding of the commas and quotation marks.

In some embodiments, the unique ID can be embedded in fonts used by textual content. Fonts can be encoded using Unicode such as UTF-8. The UTF-8 is based on variable width character encoding, which uses one to four 8-bit bytes. Embedding the unique ID in some of the bits may slightly change pixel positions, size, angle, shape of font or punctuations invisible to the naked eye. For example, pixels of text fonts and punctuations can be encoded with redundancy. Redundancy is normally added to pixels for error checking in data communications. Redundancy such as check bits can be used to check data integrity at the receiver end. If the check bits are not consistent with the rest of the information bearing pixels when they arrive at the receiver, the receiver can ask the sender to retransmit the content. The unique ID can be randomly embedded in redundant pixels or embedded in redundant pixels in fixed positions. It is to be understood that the unique ID can also be invisibly embedded in other hidden characteristics of fonts or punctuations.

In some embodiments, the unique ID can be embedded in forms or tables within or containing the copyrighted content. Those embodiments are especially suitable for right authentication of text or images inserted in online forms or tables. For example, an online form can be a form defined in the Hypertext Markup Language (HTML) definition of a webpage (such as by using the "<form>" tag) and rendered by a browser program displaying the webpage. Similarly, an online table can be a table defined in the Hypertext Markup Language (HTML) definition of a webpage (such as by using the "<table>" tag) and rendered by a browser program displaying the webpage. The unique ID can be invisibly embedded in values associated with color, shade, cell size, or other properties of the forms or tables. The unique ID can be extracted for copyright infringement identification when the forms or tables containing the copyrighted content are copied by potential copyright infringers without permission.

In some embodiments, the unique ID can be embedded in background texture of physical or digital data carriers. In some cases, the unique ID can be embedded to physical media that copyrighted content can be printed or written on. For example, the unique ID can be converted into a unique mesh pattern, which can serve as a digital watermark. A document image in which copyright information is embedded by superimposing the mesh pattern as a document background can then be printed on physical papers. A scan or picture image of the watermarked printed papers can be filtered to extract the digital watermark in copyright authentication. As another example, the unique ID can be embedded as digital watermark into hue component of the physical paper, such that it is more tolerant to digital-to-analog conversion and can be more easily extracted.

In some cases, the unique ID can be embedded in electronic media that can be used to display or publish copyright content. For example, the unique ID can be embedded in background textures of webpages or electronic files such as MICROSOFT WORD, POWERPOINT, or ADOBE PDF. In some cases, the unique ID can be embedded in a film or screen attached or integrated to an electronic display. In those cases, the embedding of the unique ID can take advantage of the texture of the physical paper, the background of the electronic files, or the firm or screen. Those embodiments are especially suitable for scenarios that potential copyright infringers use scanned copies or pictures taken of the copyrighted content without permission from the right holder, the unique ID embedded in the physical media or electronic display that carry the copyrighted content can be extracted to identify potential copyright infringement.

Figure 4:
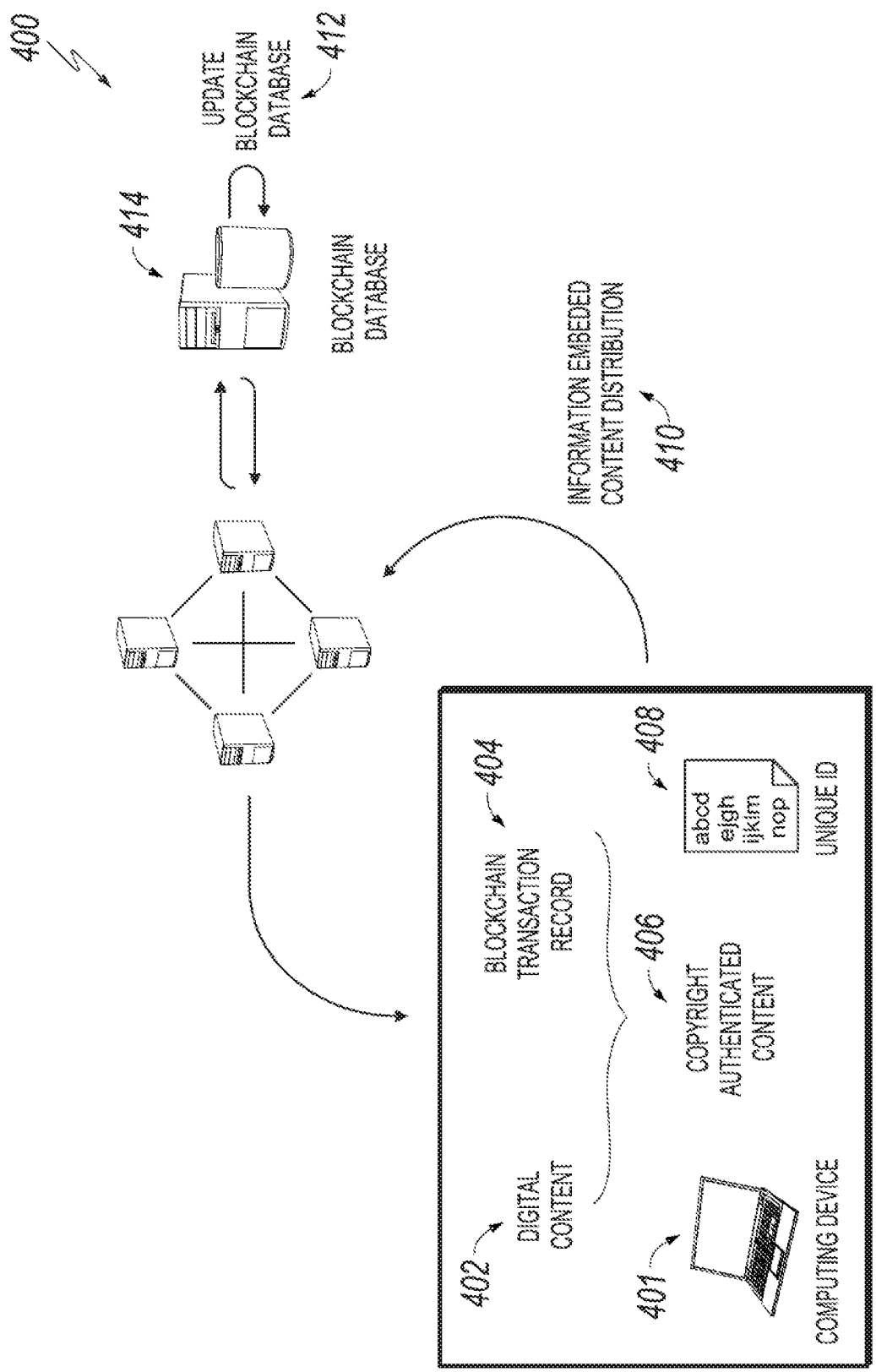
FIG. 4 depicts an example of a content processing process in accordance with embodiments of this specification.

FIG. 4 depicts an example of a content processing process 400 in accordance with embodiments of this specification. At a high-level, the process 400 can be performed by a computing device 401, a blockchain database 414, and a blockchain network 416. The computing device 401 can be communicably coupled to the blockchain network 416 through wired or wireless communications. Alternatively or additionally, the computing device 401 can be a consensus node of the blockchain network 416.

The computing device 401 can generate or update a digital content 402. The digital content can be 402 a copyrighted digital content. The computing device 401 can also perform blockchain-based copyright authentication based on blockchain transaction record 404 retrieved from a distributed ledger maintained by the blockchain network 416. In some embodiments, the blockchain transaction record 404 can be retrieved from the blockchain database 414 that maintains a complete ledger of the blockchain. Blockchain-based copyright authentication can be performed similarly to the description of step 304 of FIG. 3 to provide copyright authenticated content 406.

In some embodiments, the blockchain network 416 can be a consortium blockchain network. In such cases, copyrighted blockchain data can be managed by one or more primary nodes of the blockchain network 416. In some embodiments, the one or more primary nodes can issue a copyright certificate to the computing device 401 to authenticate the digital content 402 based on blockchain data stored in the blockchain database 412 or the consortium blockchain.

After copyright authentication, the digital content 402 becomes copyright authenticated content 406. The computing device 401 can then generate a unique ID 408 associated with copyright information of the digital content 402. The unique ID 408 can be invisibly embedded in the copyright authenticated content 406. Generation of unique ID 408 can be similarly performed as discussed in the description of step 306 of FIG. 3. Invisibly embedding the unique ID 408 to copyright authenticated content 406 can be similarly performed as discussed in the description of 308 of FIG. 3.

After invisibly embedding copyright information, the computing device 401 can perform information embedded content distribution 410 to one or more nodes of the blockchain network 416. In some embodiments, blockchain nodes can generate blockchain data corresponding to the information embedded content. The blockchain data can include block data (block header) and block transactions (block body). Blockchain transactions corresponding to information embedded content distribution 410 or other content updates can be recorded to update the distributed ledger of the blockchain network 416.

FIG. 5 depicts an example of a blockchain transaction record 500 in accordance with embodiments of this specification. The blockchain transaction record 500 can be identified and retrieved based on a blockchain transaction ID 502 associated with the transaction. The blockchain transaction record 500 can include histories of copyrighted content such as time of the transaction 504, ownership information 506, sender's address 508, receiver's address 510, fees and prices 512, and block address corresponding to the transaction 514.

Referring back to FIG. 4, after information embedded content distribution 410 is performed, a blockchain database 414 communicably coupled to the blockchain network 416 can be updated 412. The blockchain database 414 can store updates of the information embedded content and newly performed transactions associated with the content. The updated blockchain transaction record 404 can include a longer chain-of-records associated with the digital content 402. As such, it can be more reliably used to authenticate the digital content 402 in future transactions.

Figure 6:
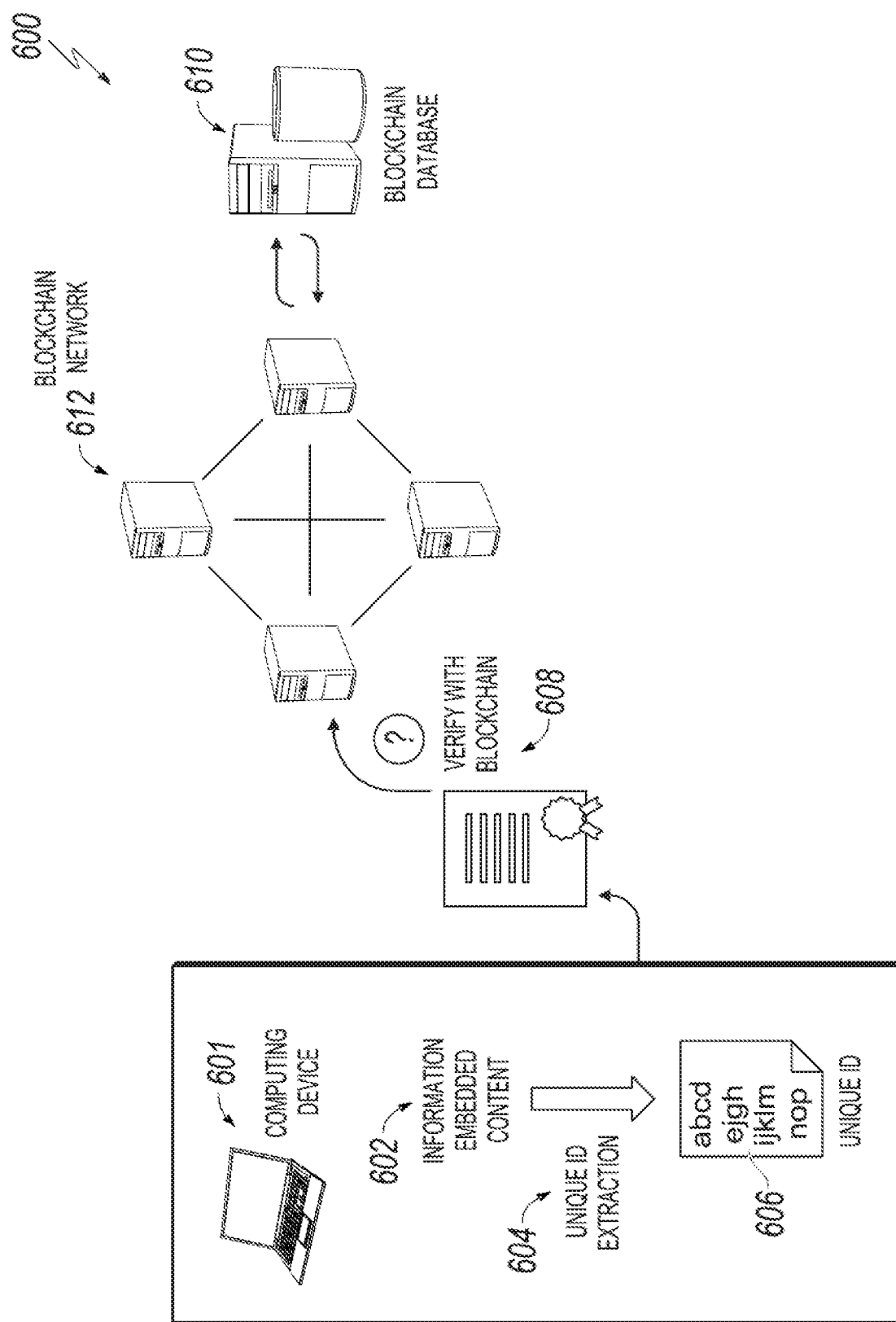
FIG. 6 depicts an example of a copyright infringement determination process in accordance with embodiments of this specification.

FIG. 6 depicts an example of a copyright infringement determination process 600 in accordance with embodiments of this specification. At a high-level, the process 600 can be performed by a computing device 601, a blockchain network 612, and a blockchain database 610. The process 600 can be performed to detect potential copyright infringement based on copyright information embedded content 602. As discussed in the description of FIG. 3, a unique ID can be embedded in copyrighted content to produce the information embedded content 602. The unique ID can be invisibly embedded in pixels, angles, colors, fonts, texture, brightness, spatial or frequency coefficients, or other characteristics of data carriers based on digital watermarking. Suitable data carriers can include text, punctuations, images, videos, forms, tables, physical media, electronic media, films or screens.

To police unauthorized use of copyrighted content, the computing device 601 can perform unique ID extraction 604 based on at least a portion of the information embedded content 602 found online or from a digital file. The extracted unique ID 606 can be used to identify transaction records associated with the copyrighted content from the blockchain network 612 or the blockchain database 610. If the transaction records are successfully identified and the right holder associated with the records does not match the user of the information embedded content 602, it can be determined that potential copyright infringement may have occurred. In some embodiments, the unique ID 606 can also be used to retrieve the latest copyrighted content stored in the blockchain database 610. The retrieved copyrighted content can be used as an authentic copy to determine whether another copy of the copyrighted content is tampered with.

Figure 7:
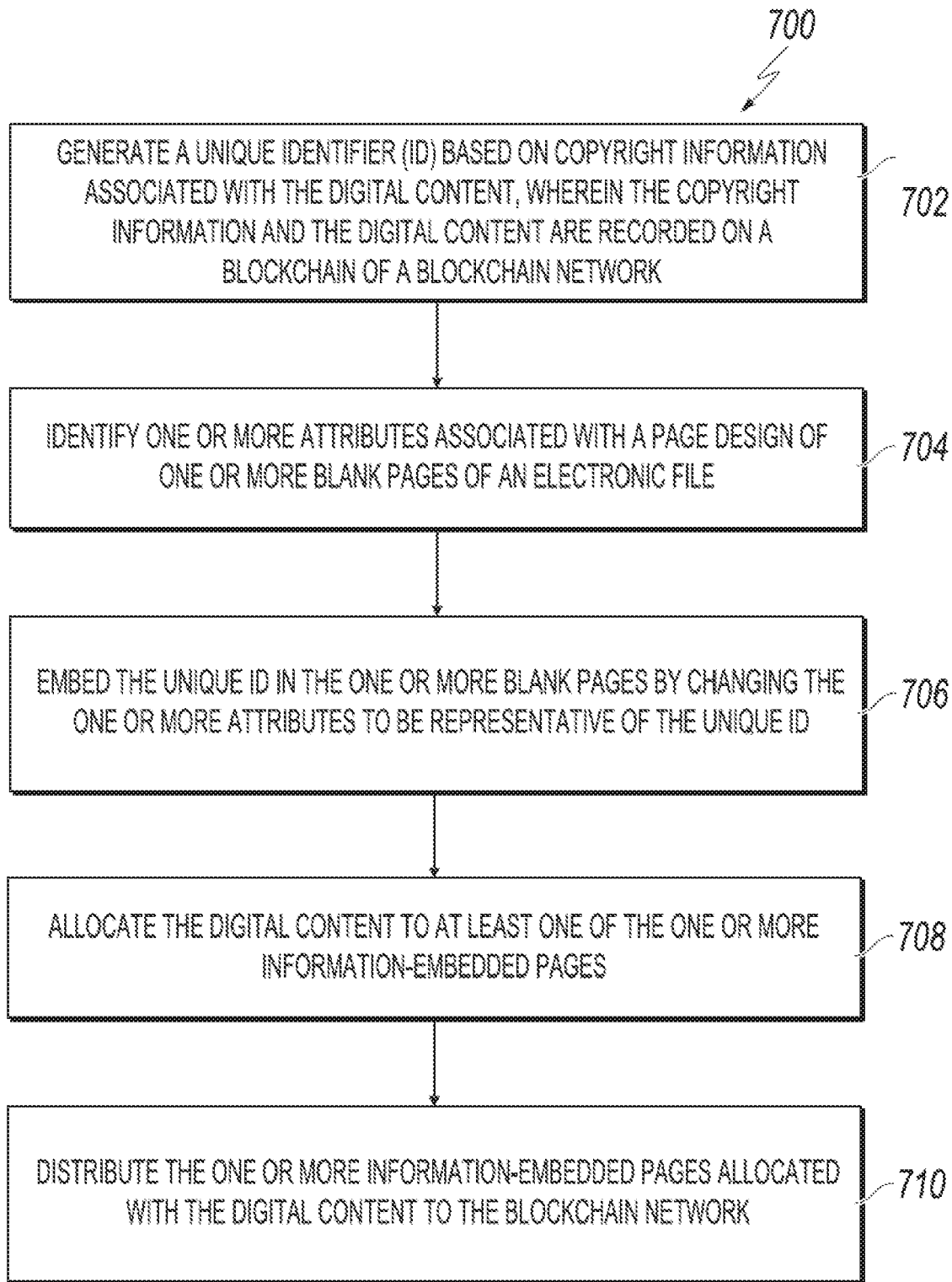
FIG. 7 depicts an example of a process that can be executed in accordance with embodiments of this specification.

FIG. 7 depicts an example of a process 700 that can be executed in accordance with embodiments of this specification. For clarity of presentation, the description that follows generally describes the example process 700 in the context of the other figures in this description. However, it will be understood that the example process 700 can be performed, for example, by any system, environment, software, and hardware, or a combination of systems, environments, software, and hardware, as appropriate. In some implementations, various steps of the example process 700 can be run in parallel, in combination, in loops, or in any order.

For convenience, the process 700 will be described as being performed by a one or more computing devices, located in one or more locations, and programmed appropriately in accordance with this specification. For example, a computing device in a computing system, e.g., the computing system 106, 108 of FIG. 1, appropriately programmed, can perform the process 700.

At 702, the computing device generates a unique ID based on copyright information associated with the digital content, wherein the copyright information and the digital content are recorded on a blockchain of a blockchain network.

At 704, the computing device identifies one or more attributes associated with a page design of one or more blank pages of an electronic file. The blank pages can be pages that do not include digital content. The page design can include designing page theme, format, and background (e.g, watermark, color, borders, etc.).

At 706, the computing device embeds the unique ID in the one or more blank pages by changing the one or more attributes to be representative of the unique ID, wherein the embedding produces one or more information-embedded pages that each enables retrieval of the copyright information from the blockchain based on the unique ID, and wherein a visual difference between the one or more blank pages and the one or more information-embedded pages is not apparent to an unaided human eye.

At 708, the computing device allocates the digital content to at least one of the one or more information-embedded pages.

At 710, the computing device distributes the one or more information-embedded pages allocated with the digital content to the blockchain network.

In some cases, before generating the unique ID, the computing device authenticates that a copyright holder holds a copyright of the digital content based on a blockchain transaction ID associated with a transaction that recorded the digital content in the blockchain.

In some cases, the copyright information associated with the digital content includes one or more of at least a portion of the digital content or identity information of a copyright holder of the digital content.

In some cases, the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content.

In some cases, the one or more transaction records include one or more of creatorship, copyright ownership, update history, a timestamp, a location, or a license associated with the digital content.

In some cases, a computing device digitally signs the unique ID using a private key assigned to the copyright holder.

In some cases, the unique ID is generated based on one of hashing the copyright information using a hash function or encrypting the copyright information using a public key assigned to the copyright holder.

In some cases, the unique ID is further generated based on one or more of a timestamp or an address associated with the copyright information.

In some cases, embedding the unique ID is performed based on digital watermarking using one or more of a discrete wavelet transform, a discrete cosine transform, a singular value decomposition, a least significant bit, or undetectable steganography.

In some cases, the one or more attributes associated with the one or more blank pages include one or more of color, texture, pattern, theme, and border style. The blank pages can be pages of electronic files such as MICROSOFT WORD, POWERPOINT, EXCEL, or ADOBE PDF, etc.

In some cases, the one or more blank pages are visually represented by a plurality of pixels distributed based on the one or more attributes.

In some cases, the digital content is embedded with the unique ID. In such cases, the copyright information can be identified based on retrieving the unique ID from the digital content or the one or more information-embedded pages.

Figure 8:
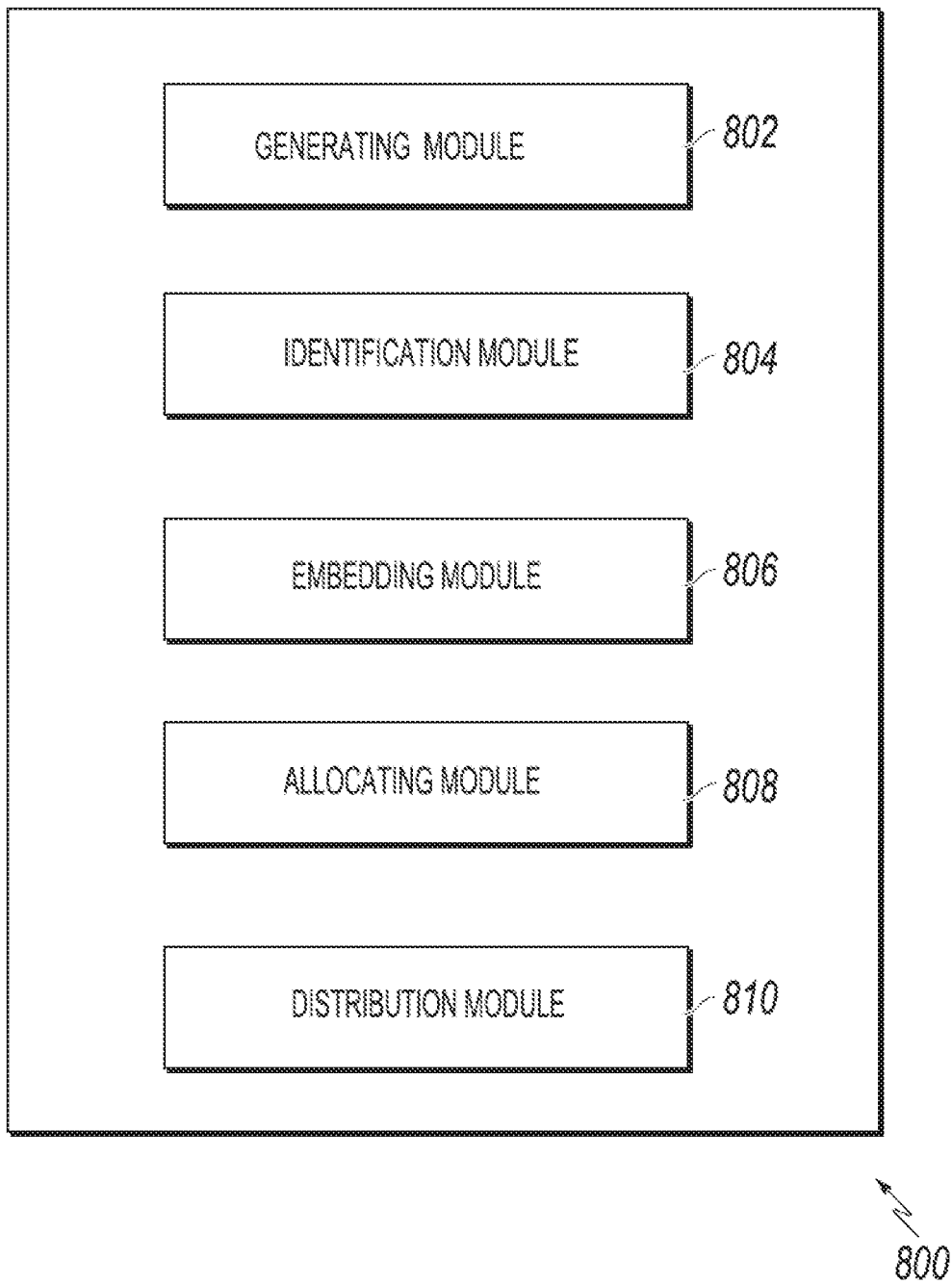
FIG. 8 depicts examples of modules of an apparatus in accordance with embodiments of this specification.

FIG. 8 is a diagram of an example of modules of an apparatus 800 in accordance with embodiments of this specification. The apparatus 800 can be an example of an embodiment of a client computing device configured to perform copyright information embedding for copyright protection. The apparatus 800 can correspond to the embodiments described above, and the apparatus 800 includes the following: a generating module 802 for generating a unique ID based on copyright information associated with the digital content, wherein the copyright information and the digital content are recorded on a blockchain of a blockchain network; an identification module 804 for identifying one or more attributes associated with a page design of one or more blank pages of an electronic file; an embedding module 806 for embedding the unique ID in the one or more blank pages by changing the one or more attributes to be representative of the unique ID, wherein the embedding produces one or more information-embedded pages that each enables retrieval of the copyright information from the blockchain based on the unique ID, and wherein a visual difference between the one or more blank pages and the one or more information-embedded pages is not apparent to an unaided human eye; an allocating module 808 for allocating the digital content to at least one of the one or more information-embedded pages; and a distribution module 810 for distributing the one or more information-embedded pages allocated with the digital content to the blockchain network.

In an optional embodiment, the apparatus 800 further includes an authentication sub-module for authenticating, before generating the unique ID, that a copyright holder holds a copyright of the digital content based on a blockchain transaction ID associated with a transaction that recorded the digital content in the blockchain.

In an optional embodiment, the copyright information associated with the digital content includes one or more of at least a portion of the digital content or identity information of a copyright holder of the digital content.

In an optional embodiment, the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content.

In an optional embodiment, the one or more transaction records include one or more of creatorship, copyright ownership, update history, a timestamp, a location, or a license associated with the digital content.

In an optional embodiment, the apparatus 800 further includes a digital signing sub-module to digitally signing the unique ID using a private key assigned to the copyright holder In an optional embodiment, the unique ID is generated based on one of hashing the copyright information using a hash function or encrypting the copyright information using a public key assigned to the copyright holder.

In an optional embodiment, the unique ID is further generated based on one or more of a timestamp or an address associated with the copyright information.

In an optional embodiment, embedding the unique ID is performed based on digital watermarking using one or more of a discrete wavelet transform, a discrete cosine transform, a singular value decomposition, a least significant bit, or undetectable steganography.

In an optional embodiment, the one or more attributes associated with the one or more blank pages include one or more of color, texture, pattern, theme, and border style.

In an optional embodiment, the one or more blank pages are visually represented by a plurality of pixels distributed based on the one or more attributes.

In an optional embodiment, the digital content is embedded with the unique ID.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

The techniques described in this specification produce several technical effects. For example, embodiments of the subject matter permit identification and authentication of creators or right holders of copyrighted content based on transaction records stored on a blockchain. The transaction records can be used as evidence to resolve copyright dispute between alleged right holders. The transaction records can also be used for seeking permissions from the authenticated right holders to copy, modify, license, distribute, or publicly display the copyrighted content. Moreover, records on blockchain can be used by right holders to identify and police copyright infringement.

In some embodiments, a unique ID can be invisibly embedded in copyrighted content as a digital watermark to identify potential copyright infringement or illegal changes of copyrighted content. Because the digital watermark is invisibly embedded, it does not visibly affect the presentation of the copyrighted content. The invisible digital watermark can also be difficult to discern and remove by potential infringers to counter infringement detection.

To police unauthorized use of copyrighted content, the unique ID can be extracted to retrieve transaction records of the copyrighted content from the blockchain. If the transaction records are identified and the user of the copyrighted content is not the right holder or a licensee of the copyrighted content, it can be determined that potential copyright infringement may have occurred. In some embodiments, the unique ID can also be used to retrieve the latest copyrighted content stored on the blockchain to determine whether the copyrighted content is tampered with.

The unique ID can also be embedded in physical media, or a screen attached or integrated to an electronic display. When a potential infringer uses scanned copy or pictures taken of the copyrighted content without permission from the right holder, the unique ID embedded in the physical media or electronic display that carry the copyrighted content can be extracted to identify potential copyright infringement.

Described embodiments of the subject matter can include one or more features, alone or in combination. For example, in a first embodiment, a computer-implemented method for embedding copyright information in one or more pages for presenting digital content, the method comprising: generating, by a computing device, a unique ID based on copyright information associated with the digital content, wherein the copyright information and the digital content are recorded on a blockchain of a blockchain network; identifying, by the computing device, one or more attributes associated with a page design of one or more blank pages of an electronic file; embedding, by the computing device, the unique ID in the one or more blank pages by changing the one or more attributes to be representative of the unique ID, wherein the embedding produces one or more information-embedded pages that each enables retrieval of the copyright information from the blockchain based on the unique ID, and wherein a visual difference between the one or more blank pages and the one or more information-embedded pages is not apparent to an unaided human eye; allocating, by the computing device, the digital content to at least one of the one or more information-embedded pages; and distributing, by the computing device, the one or more information-embedded pages allocated with the digital content to the blockchain network.

The foregoing and other described embodiments can each, optionally, include one or more of the following features:

A first feature, combinable with any of the following features, further comprising: before generating the unique ID, authenticating, by the computing device, that a copyright holder holds a copyright of the digital content based on a blockchain transaction ID associated with a transaction that recorded the digital content in the blockchain.

A second feature, combinable with any of the previous or following features, the copyright information associated with the digital content includes one or more of at least a portion of the digital content or identity information of a copyright holder of the digital content.

A third feature, combinable with any of the previous or following features, the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content.

A fourth feature, combinable with any of the previous or following features, the one or more transaction records include one or more of creatorship, copyright ownership, update history, a timestamp, a location, or a license associated with the digital content.

A fifth feature, combinable with any of the previous or following features, further comprising digitally signing the unique ID using a private key assigned to the copyright holder.

A sixth feature, combinable with any of the previous or following features, the unique ID is generated based on one of hashing the copyright information using a hash function or encrypting the copyright information using a public key assigned to the copyright holder.

A seventh feature, combinable with any of the previous or following features, the unique ID is further generated based on one or more of a timestamp or an address associated with the copyright information.

An eighth feature, combinable with any of the previous or following features, embedding the unique ID is performed based on digital watermarking using one or more of a discrete wavelet transform, a discrete cosine transform, a singular value decomposition, a least significant bit, or undetectable steganography.

A ninth feature, combinable with any of the previous or following features, the one or more attributes associated with the one or more blank pages include one or more of color, texture, pattern, theme, and border style.

A tenth feature, combinable with any of the previous or following features, the one or more blank pages are visually represented by a plurality of pixels distributed based on the one or more attributes.

An eleventh feature, combinable with any of the previous or following features, the digital content is embedded with the unique ID.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for embedding copyright information in one or more pages for presenting digital content, the method comprising:
    generating, by a computing device, a unique identifier (ID) based on copyright information associated with the digital content, wherein the copyright information and the digital content are recorded on a blockchain of a blockchain network, and wherein the copyright information associated with the digital content includes one or more of at least a portion of the digital content or identity information of a copyright holder of the digital content,
    and wherein the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content;
    identifying, by the computing device, one or more visual attributes associated with a page design of one or more blank pages of an electronic file;
    embedding, by the computing device, the unique ID in the one or more blank pages by changing the one or more visual attributes to be representative of the unique ID, wherein the embedding produces one or more unique ID-embedded pages that each enables retrieval of the copyright information from the blockchain based on the unique ID, and wherein a difference between the one or more blank pages and the one or more unique ID-embedded pages is not apparent to an unaided human eye;
    allocating, by the computing device, the digital content to at least one of the one or more unique ID-embedded pages, to produce one or more unique ID-embedded pages allocated with the digital content; and
    distributing, by the computing device, the one or more unique ID-embedded pages allocated with the digital content to the blockchain network.

2. The computer-implemented method of claim 1, further comprising:
    before generating the unique ID, authenticating, by the computing device, that a copyright holder holds a copyright of the digital content based on a blockchain transaction ID associated with a transaction that recorded the digital content in the blockchain.

3. The computer-implemented method of claim 1, wherein the one or more transaction records include one or more of creatorship, copyright ownership, update history, a timestamp, a location, or a license associated with the digital content.

4. The computer-implemented method of claim 1, further comprising:
    digitally signing, by the computing device, the unique ID using a private key assigned to the copyright holder.

5. The computer-implemented method of claim 1, wherein the unique ID is generated based on one of hashing the copyright information using a hash function or encrypting the copyright information using a public key assigned to the copyright holder.

6. The computer-implemented method of claim 1, wherein the unique ID is further generated based on one or more of a timestamp or an address associated with the copyright information.

7. The computer-implemented method of claim 1, wherein embedding the unique ID is performed based on digital watermarking using one or more of a discrete wavelet transform, a discrete cosine transform, a singular value decomposition, a least significant bit, or undetectable steganography.

8. The computer-implemented method of claim 1, wherein the one or more visual attributes associated with the one or more blank pages include one or more of color, texture, pattern, theme, and border style.

9. The computer-implemented method of claim 1, wherein the one or more blank pages are visually represented by a plurality of pixels distributed based on the one or more visual attributes.

10. The computer-implemented method of claim 1, wherein the digital content is embedded with the unique ID.

11. A non-transitory, computer-readable storage medium storing one or more instructions that, when executed by a computing device, cause the computing device to perform operations for embedding copyright information in one or more pages for presenting digital content, the operations comprising:
    generating, by the computing device, a unique identifier (ID) based on copyright information associated with the digital content, wherein the copyright information and the digital content are recorded on a blockchain of a blockchain network, and wherein the copyright information associated with the digital content includes one or more of at least a portion of the digital content or identity information of a copyright holder of the digital content,
    and wherein the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content;
    identifying, by the computing device, one or more visual attributes associated with a page design of one or more blank pages of an electronic file;

embedding, by the computing device, the unique ID in the one or more blank pages by changing the one or more visual attributes to be representative of the unique ID, wherein the embedding produces one or more unique ID-embedded pages that each enables retrieval of the copyright information from the blockchain based on the unique ID, and wherein a difference between the one or more blank pages and the one or more unique ID-embedded pages is not apparent to an unaided human eye;

allocating, by the computing device, the digital content to at least one of the one or more unique ID-embedded pages, to produce one or more unique ID-embedded pages allocated with the digital content; and distributing, by the computing device, the one or more unique ID-embedded pages allocated with the digital content to the blockchain network.

12. The non-transitory, computer-readable storage medium of claim 11, the operations further comprising:
before generating the unique ID, authenticating, by the computing device, that a copyright holder holds a copyright of the digital content based on a blockchain transaction ID associated with a transaction that recorded the digital content in the blockchain.

13. The non-transitory, computer-readable storage medium of claim 11, wherein the one or more transaction records include one or more of creatorship, copyright ownership, update history, a timestamp, a location, or a license associated with the digital content.

14. The non-transitory, computer-readable storage medium of claim 11, the operations further comprising:
digitally signing, by the computing device, the unique ID using a private key assigned to the copyright holder.

15. The non-transitory, computer-readable storage medium of claim 11, wherein the unique ID is generated based on one of hashing the copyright information using a hash function or encrypting the copyright information using a public key assigned to the copyright holder.

16. The non-transitory, computer-readable storage medium of claim 11, wherein the unique ID is further generated based on one or more of a timestamp or an address associated with the copyright information.

17. The non-transitory, computer-readable storage medium of claim 11, wherein embedding the unique ID is performed based on digital watermarking using one or more of a discrete wavelet transform, a discrete cosine transform, a singular value decomposition, a least significant bit, or undetectable steganography.

18. The non-transitory, computer-readable storage medium of claim 11, wherein the one or more visual attributes associated with the one or more blank pages include one or more of color, texture, pattern, theme, and border style.

19. The non-transitory, computer-readable storage medium of claim 11, wherein the one or more blank pages are visually represented by a plurality of pixels distributed based on the one or more visual attributes.

20. The non-transitory, computer-readable storage medium of claim 11, wherein the digital content is embedded with the unique ID.

21. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations for embedding copyright information in one or more pages for presenting digital content, the operations comprising:
generating, by a computing device, a unique identifier (ID) based on copyright information associated with the digital content, wherein the copyright information and the digital content are recorded on a blockchain of a blockchain network, and wherein the copyright information associated with the digital content includes one or more of at least a portion of the digital content or identity information of a copyright holder of the digital content, and wherein the digital content is recorded on the blockchain as a first transaction associated with a first blockchain transaction ID and the identity information is associated with a second transaction associated with a second blockchain transaction ID, and wherein the first blockchain transaction ID or the second blockchain transaction ID is associated with one or more transaction records associated with the digital content;

identifying, by the computing device, one or more visual attributes associated with a page design of one or more blank pages of an electronic file;

embedding, by the computing device, the unique ID in the one or more blank pages by changing the one or more visual attributes to be representative of the unique ID, wherein the embedding produces one or more unique ID-embedded pages that each enables retrieval of the copyright information from the blockchain based on the unique ID, and wherein a difference between the one or more blank pages and the one or more unique ID-embedded pages is not apparent to an unaided human eye;

allocating, by the computing device, the digital content to at least one of the one or more unique ID-embedded pages, to produce one or more unique ID-embedded pages allocated with the digital content; and distributing, by the computing device, the one or more unique ID-embedded pages allocated with the digital content to the blockchain network.

22. The system of claim 21, the operations further comprising:
before generating the unique ID, authenticating, by the computing device, that a copyright holder holds a copyright of the digital content based on a blockchain transaction ID associated with a transaction that recorded the digital content in the blockchain.

23. The system of claim 21, the operations further comprising:
digitally signing, by the computing device, the unique ID using a private key assigned to the copyright holder.

24. The system of claim 21, wherein embedding the unique ID is performed based on digital watermarking using one or more of a discrete wavelet transform, a discrete cosine transform, a singular value decomposition, a least significant bit, or undetectable steganography.

25. The system of claim 21, wherein the one or more blank pages are visually represented by a plurality of pixels distributed based on the one or more visual attributes.

* * * * *